United States Patent

[11] 3,614,228

[72] Inventor William E. Lyon
Seabrook, Tex.
[21] Appl. No. 763,743
[22] Filed Sept. 30, 1968
[45] Patented Oct. 19, 1971
[73] Assignee The United States of America as represented by the Administrator of the National Aeronautics and Space Administration

[54] OPTICAL RANGE FINDER HAVING NONOVERLAPPING COMPLETE IMAGES
1 Claim, 7 Drawing Figs.
[52] U.S. Cl. .................................................. 356/17, 356/18
[51] Int. Cl. .................................................. G01c 3/12
[50] Field of Search ........................................... 356/7, 9, 11, 13-17, 19-22, 18

[56] References Cited
UNITED STATES PATENTS
819,031 4/1906 Beck ........................... 356/15
889,625 6/1908 Konig et al. .................. 356/19
2,685,814 8/1954 Sloan ............................. 356/17
1,294,341 2/1919 Jolly ............................. 356/17
1,905,485 4/1933 Mihalyi ......................... 356/17

Primary Examiner—William L. Sikes
Assistant Examiner—F. L. Evans
Attorneys—G. T. McCoy, Marvin F. Matthews and Russell E. Schlorff ABSTRACT: A 90–100 percent reflective first surface mirror is disposed to direct a reflected image to a 70 percent reflective, 30 percent transmitting beam splitter which reflects the reflected image along a light path parallel to the light path of the true image to thereby produce two separate full view images. The true image and reflected image are directed through a magnifying telescope having infinite projected crossed vertical and horizontal reticles. The mirror is rotatable to change the vertical displacement of the reflected image from the horizontal reticle and when the two images are equally displaced from the horizontal reticle, the range of the image may be found by triangulation.

William E. Lyon
INVENTOR.

BY
Russell E. Schloff
ATTORNEY

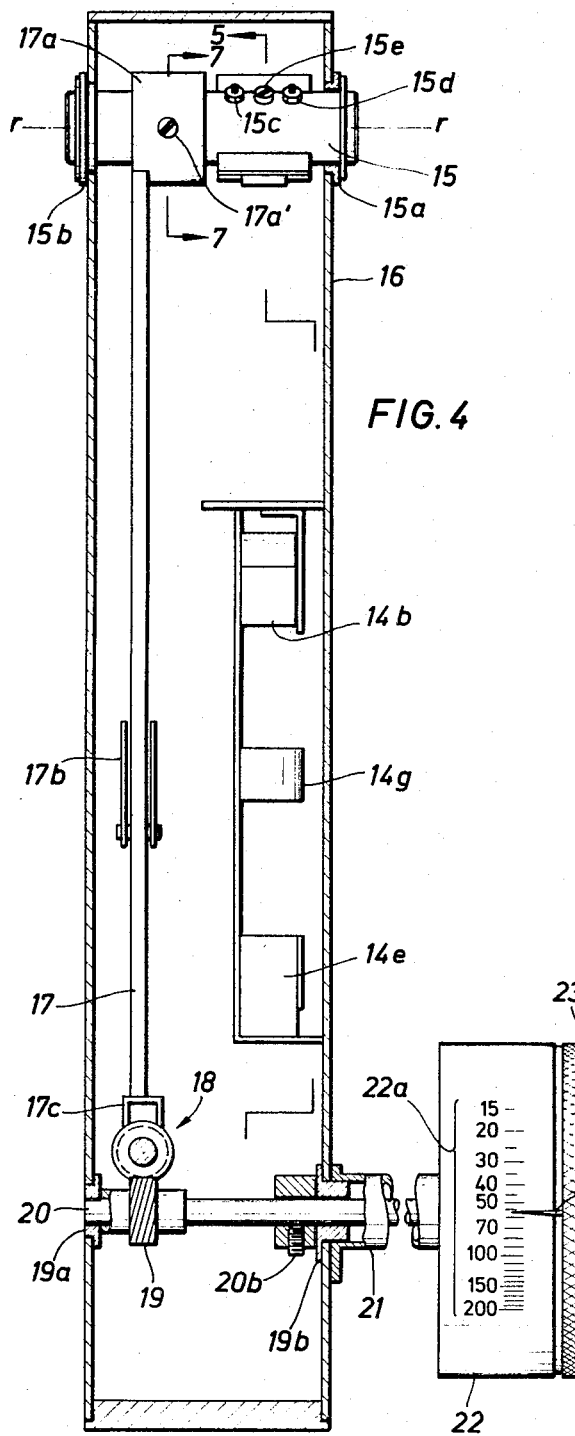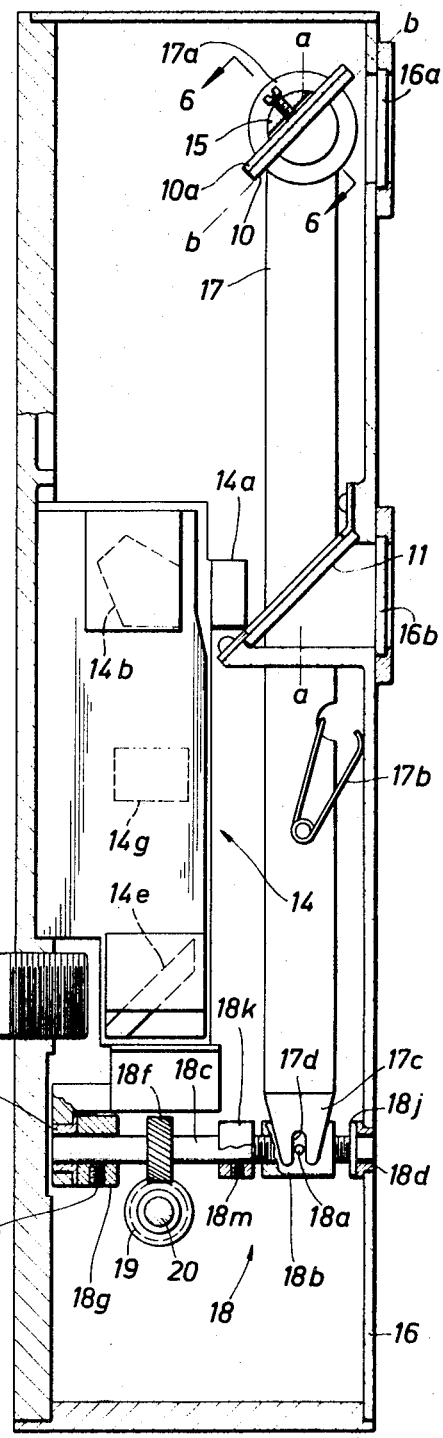

OPTICAL RANGE FINDER HAVING NONOVERLAPPING COMPLETE IMAGES

The invention described herein was made by an employee of the U.S. Government and may be manufactured and used by or for the Government for Governmental purposes without the payment of any royalties thereon or therefor.

BACKGROUND OF THE INVENTION

1. Field of the Invention

The present invention relates generally to distance measuring and in particular to a method and apparatus for optically determining distance by triangulation.

2. Brief Description of the Prior Art

Direct-reading optical range finders are generally one of three types, each of which employs the principle of triangulation for determining the unknown distance to be measured. In the statiametric-type rangefinders, the object to be ranged is split into two distinct images and a reflective surface is rotated until the bottom of one image is positioned directly above and in contact with the top of the other image. The angular position of the reflective surface may then be determined and if one dimension of the ranged object is known, the distance to the object may be calculated. An example of a range finder employing this principal may be found in U.S. Pat. No. 2,401,746.

In the coincident-image-type range finder, two images of the object to be ranged are superimposed. The angular position of a first reflective surface is thereby obtained and with a known length between the first reflective surface and a second optical element in the range finder, the distance to the object may be calculated.

In the third type range finder, the object to be ranged is split in a left and right half and the split image is brought together to form a complete image. The angle of the reflective surfaces is used to find the distance to the object. This method is exemplified in U.S. Pat. No. 2,764,054 to Etienne.

Still another method employs a prism having an apex which may be adjusted to bring it into alignment with the focal point of a fixed lense or "objective." When no discontinuity is observed in the image of the object to be ranged, the position of the prism apex may be used to solve for the distance to the object. Such a system is illustrated in U.S. Pat. No. 2,969,706 issued to Rosier et al.

The described prior art devices often require precision lenses or reflective surfaces and delicate calibration mechanisms which are costly and difficult to maintain. In statiametric-type range finders, one dimension of the object to be ranged must be known, thereby limiting the applicability of such devices. Most importantly, the range finders disclosed in the prior art are difficult to employ when the object to be ranged has an irregular or indistinct outline.

SUMMARY OF THE INVENTION

The range finder of the present invention includes a fixed 70 percent reflecting and 30 percent transmitting beam splitter and a spaced, rotatable 90-100 percent reflective, first surface mirror. The image from the object to be ranged passes directly through the beam splitter to a two power telescope which includes crossed, infinite focus, horizontal and vertical reticles. The reflected image of the object to be ranged is directed from the mirror to the beam splitter which in turn reflects the image to the telescope along a light path which is parallel to but displaced from the light path of the true image. In one embodiment with the mirror disposed vertically above the beam splitter, the plane of the mirror is fixed in a canted position with respect to the plane of the beam splitter to provide lateral separation between the real and reflected images and to position them equally on either side of the vertical reticle. The object to be ranged is then triangulated by rotating the canted mirror about a fixed horizontal-ranging axis extending through the plane of the canted mirror until the two images are equally positioned with respect to the horizontal reticle. The adjustment of the mirror about the ranging axis establishes one angle required for the triangulation. The adjacent side of the triangulation triangle is known, being the vertical distance between the mirror and beam splitter, and the distance to the object may, therefore, be calculated or the mirror may be linked to a suitable indicating mechanism so that the angle of rotation of the mirror about the ranging axis may be employed to provide a directly readable indication of distance.

By employing a method wherein two separate and distinct images are equally spaced from a reference line, consistently accurate readings may be obtained, even when ranging on objects having irregular or indistinct outlines. Moreover, the components of a device embodying the method of the present invention are few and inexpensive to produce.

BRIEF DESCRIPTION OF THE DRAWINGS

FIG. 4 is an elevation, partly in section, illustrating one embodiment of the range finder of the present invention;

FIG. 5 is a cross section of the range finder of the present invention taken along the line 5—5 of FIG. 4;

DESCRIPTION OF THE PREFERRED FORM OF THE INVENTION

Figures 1, 2, 3, 6, 7:
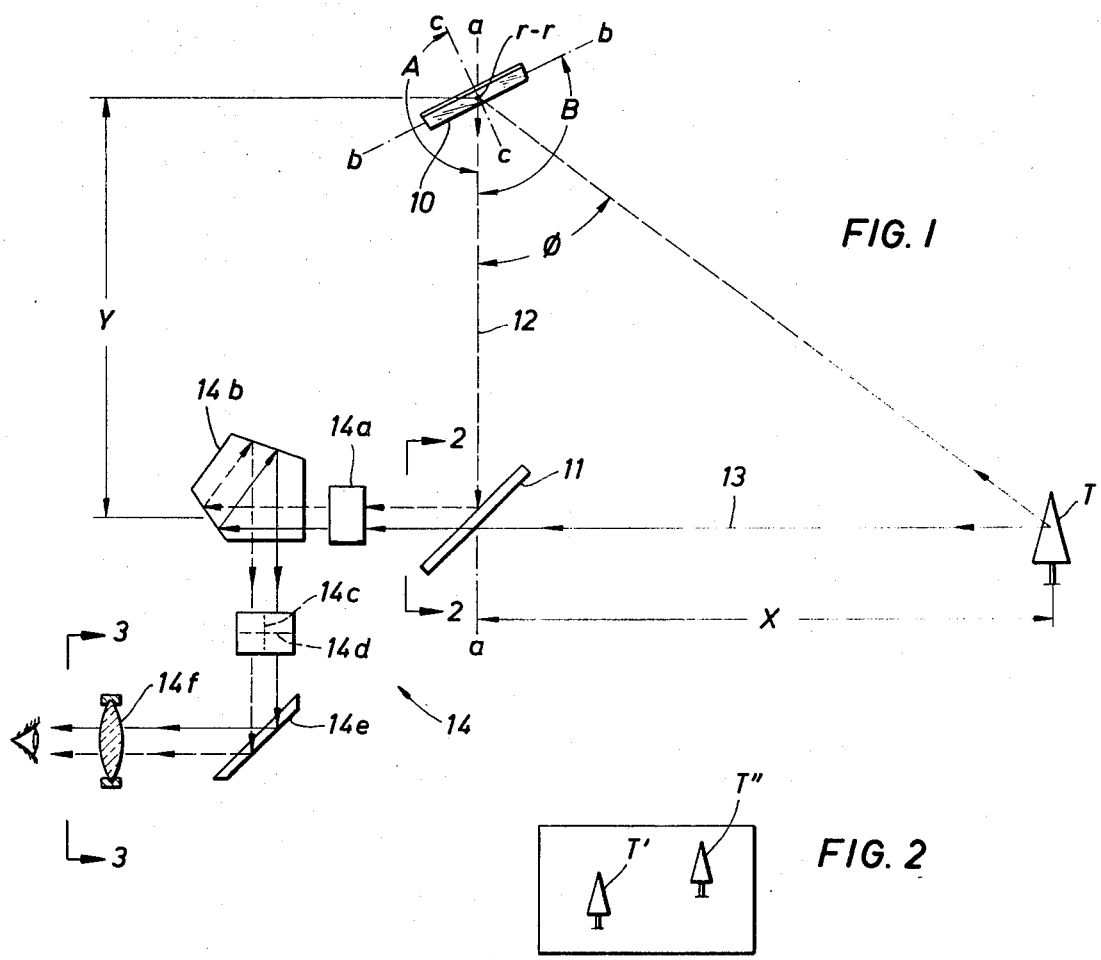
FIG. 1 is a schematic illustration of the range finder and method of the present invention.
FIG. 2 illustrates the view which would be seen along the line 2—2 of FIG. 1.
FIG. 3 illustrates an adjusted view which would be seen along the line 3—3 of FIG. 1.
FIG. 6 is an enlarged partial cross section taken along the line 6—6 of FIG. 5 illustrating certain details in the construction of the range finder of the present invention.
FIG. 7 is an enlarged partial cross section taken along the line 7—7 of FIG. 4 illustrating certain details in the adjustment of the range finder of the present invention.

With reference to FIG. 1, the range finder of the present invention includes a reflective surface such as a 90-100 percent first surface mirror 10 and a means for transmitting one image while reflecting another, such as a 30 percent transmission, 70 percent reflective beam splitter 11. When the mirror 10 is disposed vertically above the beam splitter 11, a distant object such as a tree T will be observed as a true image T' and a separate reflected image T'' as illustrated in FIG. 2. The image separation is accomplished by directing one image along the light path indicated by the dotted line 12 while the true image is transmitted through the beam splitter 11 along a direct light path indicated by the solid line 13. The vertical separation between the light paths 12 and 13 as they leave the beam splitter 11 produces the vertical displacement of the real and reflected images illustrated in FIG. 2.

The relative position of the real and reflected images with respect to each other is altered by changing the angular position of the mirror 10 with respect to the plane of the beam splitter 11. Thus, with reference to a vertical axis $a$—$a$ which extends through the plane of the mirror 10 and beam splitter 11, the lateral displacement between the images T' and T'' is altered by rotating mirror 10 about an intersecting horizontal axis $b$—$b$ lying in the plane of the first surface of the mirror to change the angle A where A is the angle formed between the axis $a$—$a$ and a line $c$—$c$ lying in the plane of the first surface of the mirror and perpendicular to the axis $b$—$b$. The relative vertical position of the two images is altered by changing the angle B which is the angle between the axes $a$—$a$ and $b$—$b$ by rotating the mirror 10 about a horizontal-ranging axis $r$—$r$ which intersects and is mutually perpendicular to the axes $a$—$a$ and $b$—$b$.

It should be understood that the reference to horizontal and vertical position of the two images is related to the relative position of the mirror 10 and beam splitter 11 illustrated in FIG. 1. When the mirror 10 and beam splitter 11 are horizontally disposed rather than vertically disposed as in FIG. 1, the lateral and vertical displacements of the images are altered by rotation of the mirror 10 about correspondingly different axis.

In the form of the invention illustrated in FIG. 1, the angle A is adjusted until the real and reflected images are separated laterally into two complete, nonoverlapping images and the mirror is fixed to prevent further rotation about the axis b—b. With the angle A thus established, the mirror 10 is then rotated about the ranging axis r—r to change the angle B until the real and reflected images are equally displaced vertically from the same horizontal reference as illustrated in FIG. 3. At this point, the light paths of the reflected and real images would lie in the same horizontal plane as they leave the beam splitter 11. When the desired lateral image separation is thus prefixed, the angular position of the mirror 10 which is required to horizontally align the two images may be employed to establish the angle Φ. The length Y of the light path between the mirror 10 and the beam splitter 11 is fixed and readily obtainable since it forms part of the range finder proper and having determined the adjacent angle Φ, the unknown distance X from the beam splitter to the tree T may be derived in a well known manner as $X = Y \tan\Phi$ If desired, the angular position of the mirror 10 about the ranging axis r—r may be coupled to a suitable calibration mechanism to provide a direct reading of the angle Φ and/or of the distance X.

In a practical embodiment of the present invention, the relative vertical displacement of the real and reflected images may be accurately determined by projecting the two light paths across a fixed horizontal reference line in the optical system employed in the range finder. For this purpose, an optical assembly indicated generally at 14 is provided. The assembly 14 which also magnifies the two images includes an 80-millimeter focal length achromatic, objective lens 14a, a pentaprism 14b for changing the direction of the light paths 12 and 13, crossed vertical and horizontal infinite projected reticles 14c and 14d (FIG. 3) respectively positioned at the focal length of the objective lens 14a, an Amici prism 14e for again changing the direction of the light paths and a 20-millimeter focal length eyepiece 14f. The view (unmagnified) as seen at the line 3—3 of FIG. 1 is illustrated in FIG. 3.

FIGS. 4–7 illustrate a specific embodiment of the range finder of the present invention which includes the mirror 10, beam splitter 11, and optical assembly 14. With reference to FIGS. 4 and 5, the mirror 10 is mounted on a flat metal plate 10a which is in turn mounted on a recess formed in a shaft 15. The shaft 15 provides the ranging axis r—r for the range finder and is rotatably mounted in a pair of bushings 15a and 15b set in a housing 16 which supports and protects the components of the range finder.

Light access into the housing 16 is provided by a window 16a in front of the mirror 10, a second window 16b in front of the beam splitter 11 and the eyepiece 14f mounted behind the Amici prism 14e. Internally of the housing 16, the optical assembly 14 is arranged in the same manner as illustrated in FIG. 1 with the pentaprism 14b being mounted directly behind the objective lens 14a and immediately above the Amici prism 14e and the reticles 14c and 14d which are contained in a mounting 14g. It will be understood that the components of the optical system 14 are set in the proper location and fixed in place within the housing 16. The mirror 10 is, however, set in an adjustable mounting on the shaft 15 to permit proper orientation about the axis b—b illustrated in FIG. 1. With reference to FIG. 6 it may be seen that the mirror 10 is mounted on the shaft 15 by means of two bolt and nut assemblies 15c and 15d. An adjustable pivot bolt 15e extends through the shaft 15 between the assemblies 15c and 15d and engages the backing plate 10a. By appropriately tightening the nut and bolt assemblies, the angular position of the mirror 10 about the axis b—b may set to produce two nonoverlapping images having the desired lateral separation. The initial angular position of the mirror 10 about the ranging axis r—r is fixed by the assembly illustrated in FIG. 7 with fine adjustment of the angular position of the mirror being accomplished by rotation of a setscrew 17e which bears against a projection 15f extending from the recessed portion of the shaft 15. The projection 15 is biased by a spring-loaded bearing pin 17f which maintains a firm engagement with the projection as the setscrew 17e is advanced or retracted. When the mirror 10 has been properly adjusted with the mountings illustrated in FIGS. 6 and 7, the housing 16 is closed over. Subsequent rotation of the shaft 15 is then employed to obtain the desired vertical image positioning of the object to be ranged.

The rotation of the shaft 15 and attached mirror 10 is controlled by a torque arm 17 rigidly secured to the shaft 15 by means of a collar 17a and setscrew 17a'. The center of the arm 17 is biased by means of a spring 17b which bears against the housing 16 and the lower end of the arm is provided with a forked connecting member 17c which is linked to a traverse assembly indicated generally at 18. Vertical slots 17d which are formed in the two arms of the connector 17c engage two pins 18a extending from the sides of a movable traverse sleeve 18b. The sleeve 18b is threadedly engaged over a traverse rod 18c which is rotatably mounted in a pair of bushings 18d and 18e. Axial displacement of the rod 18c is prevented by means of a collar 18g which is held in position against the bushing 18e by a setscrew 18h and an integrally formed mounting plate 18j which engages the bushing 18d. A ring gear 18f which is rigidly secured to the rod 18c mates with a second gear 19 rigidly mounted on a driveshaft 20. In the described assembly, rotation of the drive shaft 20 imparts a rotational movement to the rod 18c causing the internally threaded sleeve 18 b to move axially over the threads of the rod 18c between the mounting plate 18j and a limit collar 18k held in place by a setscrew 18m. The axial movement of the sleeve 18b acting through the pins 18a and connector 17c imparts a rotational movement to the torque arm 17 which in turn rotates the shaft 15 and attached mirror 10.

With reference to FIG. 5, the drive shaft 20 is rotatably mounted in the housing 16 by means of bushings 19a and 19b. Internally of the housing 16, the shaft 20 carries a sleeve 19c on which is rigidly mounted the gear 19. Axial displacement of the shaft 20 is prevented by means of a collar 20a held in position against the shaft 20 by a setscrew 20b. The shaft 20 extends through the housing 16 and into a shaft housing 21 which carries a fixed cylindrical body 22. The end of the shaft 20 is secured to a rotatable dial 23 which carries a pointer 23a. The pointer 23a extends over markings 22a formed on the body 22 and provides a directly readable indication of distance which is related to the angular position of the shaft 20 which in turn is related to the angular position of the mirror 10 about the ranging axis r—r.

In using the range finder, the housing 16 is held vertically with the operator sighting through the eyepiece 14f. The knob 23 is rotated until the two complete images of the object being ranged are observed to be equally displaced vertically from the horizontal reticle. The operator may then note the position of the pointer 23a on the markings 22a to obtain the unknown distance to the object.

It will be understood that the mirror 10 may be replaced with a suitable reflecting prism and the beam splitter 10 may be replaced by any suitable means for separating two images. It should also be noted that the calibration may be made to depend on relative lateral displacement from a vertical reference rather than relative vertical displacement from a horizontal reference. The present invention thus may be generally stated as solving for an unknown distance to an object by aligning two complete and separate images of the object relative to a fixed reference. One of the prime advantages of the range finder, in addition to its simplicity, is the ability to range on objects having irregular or hazy outlines such as clouds or trees where the overall composition of the object may be used to give consistantly accurate results.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A range finder for determining an unknown distance of an object from the range finder comprising:
   a first means for producing a first complete true image of the object including a fixed planar optical beam splitter which is partially reflective and partially transmissive;
   a second means for producing a second, complete, noncoincident reflected image of the object including a movable front surface mirror for directing a reflected image of the object to be ranged to said beam splitter;
   said beam splitter and mirror being spaced from each other along a first common axis extending through their planes;
   the plane of the mirror being angularly disposed with respect to the beam splitter to form a complete reflected image which is independent and nonoverlapping with the true image transmitted directly through said beam splitter;
   means for adjusting the angular disposition of the mirror with respect to the beam splitter about an axis transverse to said common axis for changing the relative position of the true and reflected images toward or away from each other;
   means to rotate said mirror for changing the angle of reflection from said mirror with respect to the light path from the object;
   an optical system, receiving the true and reflected images, said optical system including an objective lens for magnifying the images, and perpendicularly crossed, infinitely projected, reticles, the reticles positioned at the focal length of the objective lens; and
   calibration means mechanically linked with said mirror rotating means for correlating the angle of reflection of said mirror with a direct-readable distance scale.